May 22, 1956 P. E. GAIRE 2,746,346
MAGNIFIER FOR SLIDE RULES
Filed April 16, 1953 2 Sheets-Sheet 1

INVENTOR
PAUL E. GAIRE
BY
ATTORNEY

May 22, 1956 — P. E. GAIRE — 2,746,346
MAGNIFIER FOR SLIDE RULES
Filed April 16, 1953 — 2 Sheets-Sheet 2

INVENTOR
PAUL E. GAIRE
BY
ATTORNEY

United States Patent Office

2,746,346
Patented May 22, 1956

2,746,346

MAGNIFIER FOR SLIDE RULES

Paul E. Gaire, Midland Park, N. J.

Application April 16, 1953, Serial No. 349,227

6 Claims. (Cl. 88—39)

This invention relates to magnifiers for slide rules and more particularly to a foldable magnifier support that may be removably attached to a slide rule cursor.

Slide rules are widely used and are marketed in several types and sizes ranging from a small pocket size having graduations on one side only on up to relatively large double sided rules. The graduations on these rules are rather fine, particularly those on the smaller rules and are difficult to see especially if the operator's eye-sight is not too perfect.

To overcome this difficulty and to preclude error in calculation, it has been proposed to provide a magnifier for use with slide rules, and a foldable removably mounted double magnifier for double sided slide rules is shown in my Patent No. 2,556,806. However, this double magnifier is needlessly expensive for single sided slide rules.

Having in mind the defects of the prior art devices, it is an object of the present invention to provide a slide rule magnifier having a single magnifier with a foldable support which is removably mountable on a slide rule cursor.

It is another object of the invention to provide a slide rule magnifier having a support that is removably mountable on the side runners of the cursor, with means for centering the magnifier over the cursor.

It is a further object of the invention to provide a slide rule magnifier having simplicity of design and assembly, economy of construction and efficiency in operation.

The novel features that are considered characteristic of the invention are set forth with particularity in the appended claims. The invention itself, however, both as to its organization and method of operation, together with additional objects and advantages thereof, will best be understood from the following description of a specific embodiment when read in connection with the accompanying drawing, wherein like reference characters indicate like parts throughout the several figures, and in which:

Figure 1:
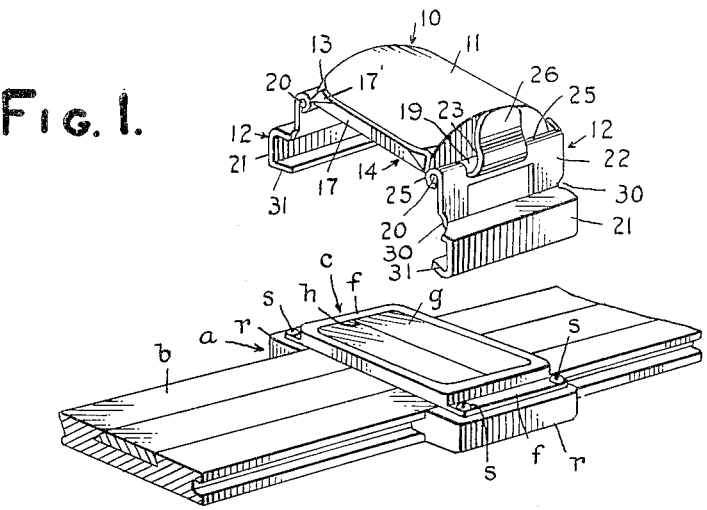
Figure 1 is an exploded view in perspective of a typical slide rule and the magnifier in accordance with the present invention.
Figure 3:
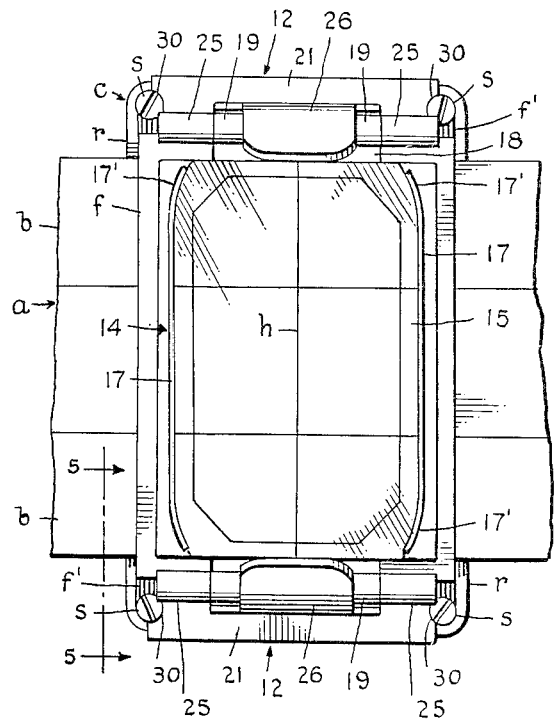
Figure 3 is a top plan view of the magnifier mounted on a slide rule.
Figure 4:
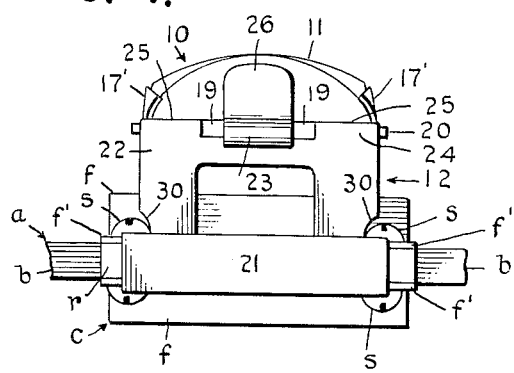
Figure 4 is an end view in elevation of the assembly shown in Figure 3.
Figure 5:
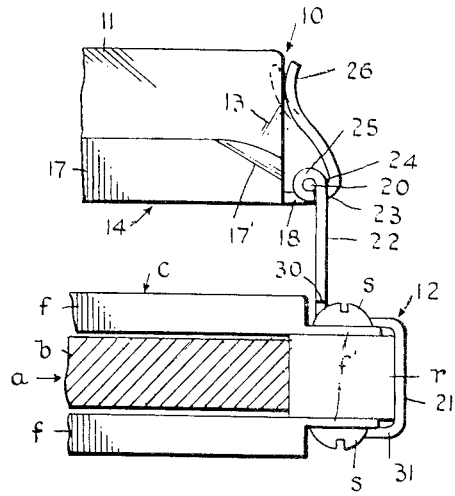
Figure 5 is a fragmentary sectional view corresponding to line 5—5 of Figure 3.

Referring now to the drawings, the magnifier is specifically adapted to be removably mounted on any typical slide rule, either of the single-faced variety, as shown in Figure 1, or the double-faced variety, as shown in Figures 4 and 5. A typical slide rule $a$ is illustrated in Figures 1, 3, 4 and 5, as comprising a rule body $b$, having a hairline carrying cursor $c$ slidably mounted thereon. In the single-faced slide rule, as shown in Figure 1, the graduations and slidable rule are on one face only of the body $b$ and the cursor $c$ has only one hairline carrying frame $f$ overlying that face, whereas in the double-faced slide rule, the body $b$ has graduations and a slideable rule on both faces, and the cursor $c$ has two hairline carrying frames $f$ respectively over each face of the body $b$, as shown in Figures 4 and 5.

In each of these typical slide rules, the cursor $c$ comprises a pair of runners $r$ for slidably engaging the edges of the rule body $b$ and the hairline frames $f$ and mounted on and extend between these runners. The only difference occurring between the two types of slide rules resides in the fact that the cursor $c$ for the double-faced rule, having the two frames $f$ on opposite sides of the runners $r$, as indicated in Figures 4 and 5, forms a sleeve that surrounds rule body $b$ and therefore is self-retained thereon, while the cursor $c$ for the single-faced slide rule, having the single frame $f$, is not self-retained and to make it so, the runners $r$, as shown in Figure 1, may be provided with inwardly extending tongues that slide in grooves longitudinally in the edges of the rule body $b$.

Except for the foregoing difference, the parts of these typical slide rules are identical in conformation, and these rules differ only in the number size of parts. In each case, the cursor frame $f$ surrounds a glass plate $g$ which carries a hairline $h$ for cooperation with the graduations on the rule body. These frames $f$ are attached to the runners $r$ by flanges $f'$ extending from each end of the frame $f$ in the plane of its underside. These flanges $f'$ are apertured in their ends for the rection of screws $s$ which secure the flanges to the runners $r$.

Figure 6:
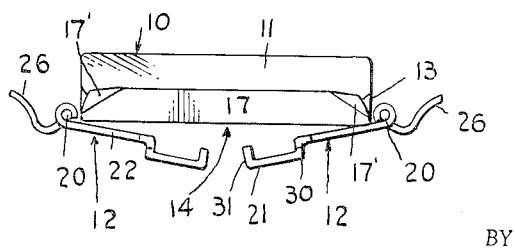
Figure 6 is a side view in elevation of the magnifier with its support in folded position.

The present invention, as shown in Figure 1, comprises a magnifier 10, comprising a single magnifying glass 11, having supporting brackets 12 pivotally mounted at each end to extend substantially perpendicularly to the glass 11 for removable mounting on the cursor $c$, as shown in Figures 3, 4 and 5, or to be folded under the glass 11 for storage, as shown in Figure 6. In addition, or alternatively, the magnifier of the present invention comprises means for centering the supporting brackets 12 on the cursor $c$ so as to center the magnifying glass or lens 11 directly over the hairline $h$, thereby precluding possible distortion.

Figure 2:
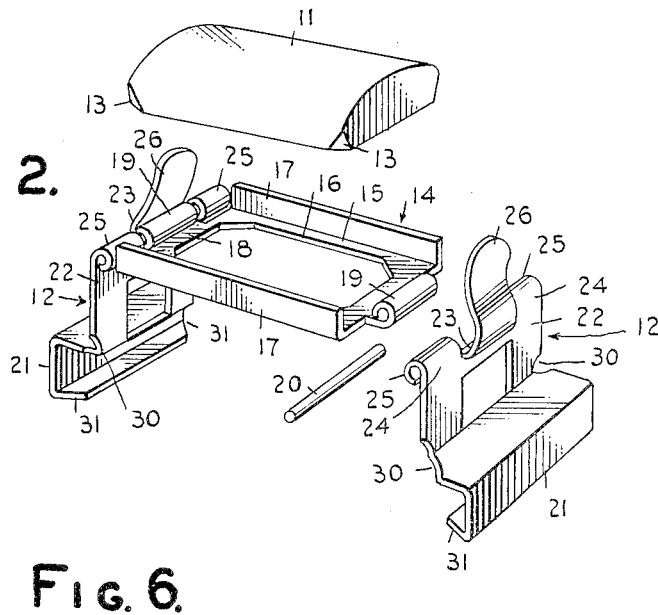
Figure 2 is an exploded view in perspective of the magnifier in accordance with the present invention.

The specific structure of the magnifier 10, in accordance with the present invention, is best shown in Figure 2, wherein it will be seen that the magnifying glass or lens 11 is typically substantially rectangular in shape with a flat underside, a curved upper side, and ends substantially perpendicular to the underside. The glass 11 has slightly beveled side corners 13. This magnifying glass 11 is mounted in a frame 14 which comprises a flat frame portion 15, having a viewing opening 16 with flanges 17 extending upwardly from each side for the full length thereof, and tongues 18 extending centrally from each end and which are rolled to form hinge portions 19.

The magnifying glass 11 is mounted in the frame 14 between the flanges 17 with its flat underside resting on the frame portion 15. The flanges 17 are bent inwardly against the sides of the glass 11, and the corner or end portions 17' of the flanges 17 are bent inwardly around the beveled corners 13 of the glass 11 to prevent longitudinal displacement of the magnifying glass 11 relative to the frame 14. Thus, the magnifying glass is rigidly supported in the frame 14 and is not per se subjected to any stresses or strains.

The side brackets 12 are preferably formed of sheet material which is bent to form a channel portion 21 with a support portion 22 disposed perpendicularly from one flange of the channel portion. The free end of the support portion is cut to provide three tongues including a center tongue 23 and two side tongues 24. The two side tongues 24 are rolled to form hinge portions 25 which are adapted to align with and on each end of a frame hinge portion 19 and be pivotally connected by a hinge pintle 20. The center tongue 23 is bent rearwardly to accommodate the hinge portion 19 and then bent forwardly to pass over the hinge portion 19 and form a spring abutment 26 for engaging the adjacent end of the magnifying glass 11 when the bracket 12 is swung to supporting position.

The channel portion 21 is of a size to fit snugly around the runner r and the flange or flanges f', as best shown in Figure 5. Moreover, the channel portion is preferably of a length to fit between the heads of the screws s so as to center the magnifying glass 11 relative to the hairline h. As the supporting brackets 12 extend the full width of the frame 14 and glass 11, however, the brackets 12 are somewhat longer than the space between the two screws s.

Therefore, in order to center the device, the angle portions between the bracket support portion 22 and the flange of the channel portion 21 are provided with notches 30 to fit around and over the head of the screws s and thereby center the magnifier 10 on the cursor c, as best shown in Figures 3, 4 and 5. In addition, the ends 31 of the opposite or free flange of the channel portion are disposed at an angle so as to fit between the screws s on the underside, if any.

It will be obvious from the foregoing description that when the magnifier 10 is not in use, the supporting brackets 12 may be folded flat, as shown in Figure 6, so as to enable convenience in transport or storage. For use, however, the brackets 12 are swung to depend substantially perpendicularly from the frame 14 and magnifying glass 11 with the leaf abutments 26 bearing against the ends of the magnifying glass 11. The magnifier 10 is then disposed transversely of the slide rule and the channel portions 21 are slid over the runners r and flanges f' of the cursor c with the screws s nested in the notches 30 (and against the angled end 31 if on the underside) to center the magnifying lens or glass 11 relative to the cursor hairline h.

Although a certain specific embodiment of the invention has been shown and described, it is obvious that modifications thereof are possible. The invention, therefore, is not to be restricted except insofar as necessitated by the spirit of the appended claims in the light of the prior art.

What I claim is:

1. A magnifier for use with a slide rule cursor, comprising a magnifying lens of rectangular configuration, an encircling frame for said lens, a supporting bracket pivotally mounted at each end of said frame movable to be substantially perpendicular to said lens, and a channel portion on each bracket for removably fitting respectively around the cursor runners, and abutment means extending beyond the supporting brackets engageable with said lens for limiting the pivotal movement of said brackets from said lens to positions substantially perpendicular to said lens.

2. A magnifier for use with a slide rule cursor, comprising a magnifying lens of rectangular configuration, an encircling frame for said lens, a supporting bracket pivotally mounted at each end of said frame movable to be substantially perpendicular to said lens, and a channel portion on each bracket for removably fitting respectively around the cursor runners, and abutment means extending beyond the supporting brackets engageable with said lens for limiting the pivotal movement of said brackets from said lens to positions substantially perpendicular to said lens, said brackets including means for fitting against projections of a cursor for centering said lens relative to the cursor hairline.

3. A magnifier for use with a slide rule cursor, comprising a magnifying lens of rectangular configuration, an encircling frame for said lens, a supporting bracket pivotally mounted at each end of said frame movable to be substantially perpendicular to said lens, and a channel portion on each bracket for removably fitting respectively around the cursor runners, said channel portions having flange portions of a length to fit between and engage the runner attaching screws of the cursor to center the lens relative to the cursor hairline.

4. A magnifier for use with a slide rule cursor, comprising a magnifying lens of rectangular configuration, an encircling frame for said lens, a supporting bracket pivotally mounted at each end of said frame movable to be substantially perpendicular to said lens, and a channel portion on each bracket for removably fitting respectively around the cursor runners, the supporting brackets being connected with said frame by means of hinges to permit folding against said lens, said brackets including spring abutments engageable with the ends of said lens to limit the pivotal movement of said brackets from their folded position to a position substantially perpendicular to said lens.

5. A magnifier for use with a slide rule cursor, comprising a magnifying lens of rectangular configuration, an encircling frame for said lens, a supporting bracket pivotally mounted at each end of said frame movable to be substantially perpendicular to said lens, and a channel portion on each bracket for removably fitting respectively around the cursor runners, said bracket channel portions having notches for resting against the runner attaching screws on the cursor to center the lens relative to the cursor hairline.

6. A support for a slide rule magnifier, comprising a rectangular frame having upstanding side flanges adapted to detachably embrace a lens and a tongue extending outwardly from each end of said frame and rolled to form a hinge sleeve, a pair of brackets, each having hinge sleeves for respective alignment and connection with the frame hinge sleeves and a stop member engageable with the lens, a pintle at each end of said frame and extending through said sleeves and pivotally connecting said brackets with said frame, each of said brackets having a channel portion parallel with said frame and adapted to fit snugly over the runners of a slide rule cursor.

References Cited in the file of this patent

UNITED STATES PATENTS

| | | |
|---|---|---|
| 597,758 | Bausch | Jan. 25, 1898 |
| 996,039 | Keuffel | June 20, 1911 |
| 1,588,442 | Bugbee | June 15, 1926 |
| 1,605,922 | Cook | Nov. 9, 1926 |
| 2,367,872 | Kamienski | Jan. 23, 1945 |
| 2,501,550 | Tamagna et al. | Mar. 21, 1950 |
| 2,536,625 | Button | Jan. 2, 1951 |
| 2,556,806 | Gaire | June 12, 1951 |
| 2,651,235 | Barrows | Sept. 8, 1953 |